Dec. 24, 1940.  G. F. THOMAS ET AL  2,225,724
LUBRICATING APPARATUS
Filed Aug. 24, 1936
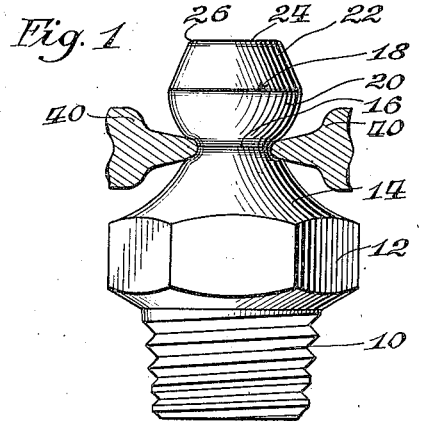
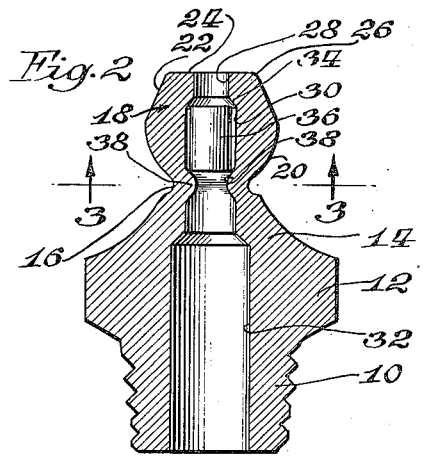
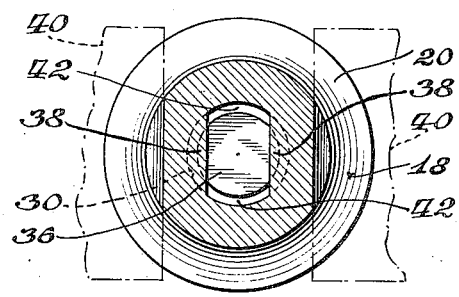
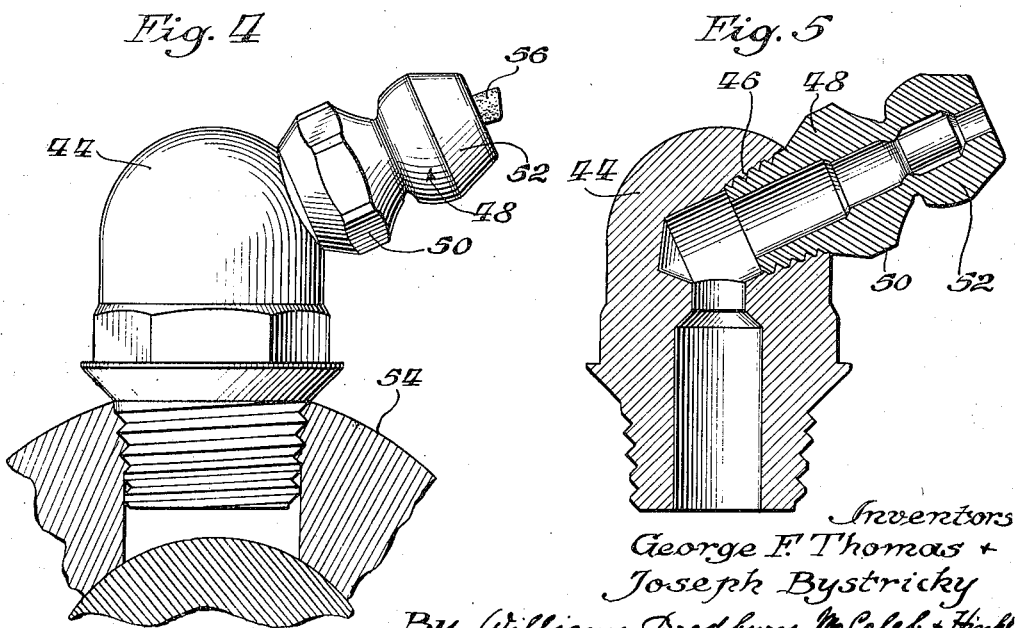
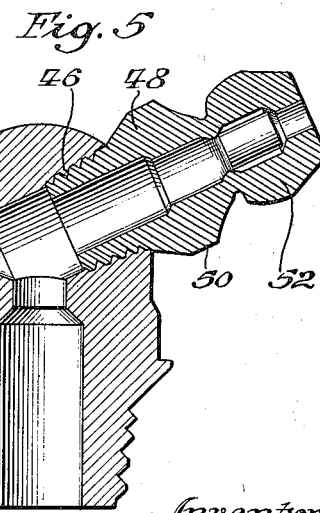
Inventors
George F. Thomas +
Joseph Bystricky
By Williams, Bradbury, McCaleb + Hinkle
Attys.

Patented Dec. 24, 1940

2,225,724

UNITED STATES PATENT OFFICE 2,225,724

LUBRICATING APPARATUS

George F. Thomas, Riverside, and Joseph Bystricky, Chicago, Ill., assignors to Stewart-Warner Corporation, a corporation of Virginia Application August 24, 1936, Serial No. 97,522

4 Claims. (Cl. 184—105)

Our invention relates to lubricant receiving fittings for high pressure lubricating systems, and more particularly to an improved form of fitting incorporating a novel type of check valve.

Due to the fact that lubricant receiving fittings are used in such large quantities, it is of course highly desirable to effect relatively minor savings in the cost of their manufacture. In the past it has been the practice to incorporate in lubricant receiving fittings for high pressure lubricating systems a spring pressed ball check valve. Such check valve, while ordinarily very satisfactory, necessitated additional operations upon the fitting to form a seat for the check valve spring. Furthermore, the springs occasionally became broken due to sudden application of lubricant pressure.

In fittings of our present invention, the check valve is made in the form of a short cylindrical plug which is of slightly lesser diameter than the bore in the fitting and this check valve is held in close proximity at its seat so that upon the slightest return flow of lubricant it will be forced against its seat to cut off further return flow. The check valve is permanently locked within the fitting by deforming the fitting slightly.

It is thus the object of our invention to provide an improved lubricant receiving fitting for high pressure lubricating systems which may be manufactured very economically and which will function efficiently.

Other objects will appear from the following description, reference being had to the accompanying drawing, in which:

Fig. 1 is an enlarged elevational view of our improved fitting;

Fig. 2 is an enlarged diametral cross sectional view thereof;

Fig. 3 is a transverse sectional view taken on the line 3—3 of Fig. 2;

Fig. 4 is an elevational view of a modified form of the fitting of our invention; and Fig. 5 is a central longitudinal section of the fitting shown in Fig. 4.

In lubricant receiving fittings for high pressure lubricating systems, it is desirable to have the inlet port of relatively small diameter so as to prevent, as far as possible, the admission of dirt and grit into the fitting. This requirement of lubricant receiving fittings, as well as other factors, has led to the common acceptance of a fitting of the general form shown in Fig. 1, wherein the fitting comprises a threaded shank 10, a hexagonal wrench engaging portion 12, a generally frusto-conical portion 14, a neck 16, and a head 18 having a spherical surface 20, a frusto-conical surface 22, and an end face 24. The circular edge 26 between the frusto-conical surface 22 and the end face 24 is rather sharp (although rounded slightly) so as to be effective for making a seal with grease gun nozzles having concave spherical contact faces.

The fitting is provided with an inlet port 28 which communicates with a slightly enlarged bore 30, the latter communicating with a counter-bore 32 which extends through the hexagonal portion 12 and threaded shank portion 10 of the fitting. A beveled valve seat 34 forms a shoulder between the inlet bore 28 and the bore 30 and provides a seat for a check valve 36 which is generally cylindrical in shape. The diameter of the check valve 36 is sufficiently less than that of the bore 30 to provide an adequate passageway for the flow of lubricant past the check valve, but is sufficiently constricted so that upon the return flow of lubricant the valve will be carried to its seat.

The check valve 36 is maintained within the bore 30 by projections 38 formed by squeezing the neck of the fitting between a pair of jaws 40, as indicated in Fig. 1. The edges of the jaws which engage the fitting are rectilinear and parallel so that the projections 38 will be generally segmental in shape, and leave adequate passageways 42 for the flow of lubricant.

In Fig. 4 the fitting shown is of the angle type and comprises a body 44 of more or less conventional construction into the threaded bore 46 of which the fitting tip 48 is screwed. The fitting tip 48 has a hexagonal wrench engaging portion 50 and a head 52 which, for practical purposes, are similar to the corresponding parts of the fitting shown in Figs. 1, 2, and 3, and similar reference characters have therefore been applied to the corresponding parts.

In using the lubricant receiving fitting, a lubricant compressor having a nozzle or coupler either of the type shown in patent to Zerk No. 1,475,980, or to Bystricky No. 2,016,809, is applied to the fitting in the usual manner and lubricant forced into the bearing 54. The lubricant will flow through the inlet port 28, to force the check valve 36 from its seat 34, flow about the cylindrical surface of the check valve 36, and thence through the passageways 42 into the bore 32. After sufficient lubricant has been supplied to the bearing, the coupler nozzle is disconnected and the residual pressure upon the lubricant in the bearing and in the fitting will cause slight return flow of lubricant which will force the check valve 36 outwardly against its seat 34, thus closing off the passageway against further return flow. However, in moving outwardly, the check valve 36 will cause extrusion of a small nib of grease as indicated at 56 in Fig. 4. With greases of the consistency normally used in high pressure lubricating systems, this nib 56 will adhere to the end face of the fitting and prevent the entrance of any dust, grit, or foreign matter into the inlet opening 28. Of course, such foreign matter may adhere to or become embedded in the nib of grease, but prior to again applying the lubricant compressor to the fitting, this nib may be easily wiped from the end face of the fitting, carrying with it the dirt or foreign matter, and assuring a supply of fresh, clean, lubricant to the bearing. In the use of a fitting which does not expel a small nib of grease, there is a tendency for dirt to collect above and at the inlet opening 28, and a certain proportion of such accumulated dirt may be forced into the bearing upon the next lubricating operation.

While we have shown and described a preferred embodiment of our invention, it will be readily understood by those skilled in the art that variations may be made in the construction disclosed without departing from the basic features of our invention. We therefore do not wish to be limited to the precise construction disclosed, but wish to include within the scope of our invention all such modifications and variations which will readily suggest themselves.

We claim:

1. A lubricant receiving fitting for high pressure lubricating systems comprising a head having an inlet port, a slightly enlarged bore adjacent to and communicating with said inlet port, there being a shoulder forming a check valve seat at the end of said bore, a cylindrical check valve mounted for limited reciprocation in said bore, and a part integral with said head and forming a projection in said bore for limiting movement of said check valve from said valve seat.

2. A lubricant receiving fitting for high pressure lubricating systems comprising a head having an inlet port, a slightly enlarged bore adjacent to and communicating with said inlet port, there being a shoulder forming a check valve seat at the end of said bore, a cylindrical check valve mounted for limited reciprocation in said bore, and a part integral with said head and forming a projection in said bore for limiting movement of said check valve from said valve seat, said check valve being of but slightly lesser diameter than that of said bore and the distance between said shoulder and said projection being but slightly greater than the corresponding dimension of the check valve, whereby the check valve will be restrained to move only a very short distance from its seat upon supplying lubricant through the fitting and will quickly be returned to its seat upon incipient return flow of lubricant.

3. A lubricant receiving fitting for high pressure lubricating systems comprising a shank, a head, and a neck portion of smaller diameter than said shank and head connecting said shank and head, said head having an inlet port and a bore extending through said head and neck, a cylindrical check valve in said bore and operable to close said port, said check valve having a diameter sufficiently smaller than said bore to permit flow of lubricant between the valve and the walls of said bore, and a projection in said bore formed integrally with said neck portion and providing a stop to limit the movement of said valve in a direction away from said port.

4. A lubricant receiving fitting comprising an integral shank, neck, and head having a passageway extending therethrough, the diameter of said head being less than that of said shank and the diameter of said neck being less than that of said head, a freely movable cylindrical check valve located in the portion of said passageway located in said head, a valve seat at the inlet end of said passageway, and a valve stop formed integrally with the neck portion of said fitting and limiting movement of said valve away from said valve seat.

GEORGE F. THOMAS.
JOSEPH BYSTRICKY.